US012764408B2

(12) United States Patent
Huddleston et al.

(10) Patent No.: US 12,764,408 B2
(45) Date of Patent: Oct. 13, 2026

(54) CAMERA SYSTEM FOR AQUATIC WILDLIFE MONITORING

(71) Applicant: Seeweed Inc., Maplewood, MN (US)

(72) Inventors: Preston Huddleston, Maplewood, MN (US); Mitch Giannini, Stillwater, MN (US); Charlie Eldredge, Elk River, MN (US); Thomas Gadbois, St. Paul, MN (US); Eric Danner, Eagan, MN (US); Isaac Ziglinski, Kansas City, MO (US); Will Becker, Eden Prairie, MN (US)

(73) Assignee: Seeweed Inc., Maplewood, MN (US)

( * ) Notice: Subject to any disclaimer, the term of this patent is extended or adjusted under 35 U.S.C. 154(b) by 93 days.

(21) Appl. No.: 18/631,634

(22) Filed: Apr. 10, 2024

(65) Prior Publication Data

US 2024/0348910 A1 Oct. 17, 2024

Related U.S. Application Data

(60) Provisional application No. 63/528,940, filed on Jul. 26, 2023, provisional application No. 63/458,448, filed on Apr. 11, 2023.

(51) Int. Cl.
*H04N 23/61* (2023.01)
*G03B 17/08* (2021.01)
(Continued)

(52) U.S. Cl.
CPC ............. *H04N 23/61* (2023.01); *G03B 17/08* (2013.01); *G06V 20/05* (2022.01); *H04N 23/617* (2023.01);
(Continued)

(58) Field of Classification Search
CPC ...... H04N 23/61; H04N 23/617; H04N 23/64; H04N 23/661; H04N 23/667; G03B 17/08; G06V 20/05; G06V 2201/07
See application file for complete search history.

(56) References Cited

U.S. PATENT DOCUMENTS

| | | | | |
|---|---|---|---|---|
| 6,119,630 | A | 9/2000 | Lobsiger et al. | |
| 6,895,884 | B1 * | 5/2005 | Velazquez | B63B 21/26 114/295 |

(Continued)

FOREIGN PATENT DOCUMENTS

| | | | |
|---|---|---|---|
| CN | 113747064 | A | 12/2021 |
| EP | 3909424 | A1 | 11/2021 |

(Continued)

OTHER PUBLICATIONS

Extended European Search Report pertaining to EP 25169132.5, mailed Sep. 9, 2025.

*Primary Examiner* — Gims S Philippe
(74) *Attorney, Agent, or Firm* — GRUMBLES LAW PLLC; Bryan Kravis

(57) ABSTRACT

The present invention describes an automated camera system designed for aquatic environments. The system includes a controller and a sealed submersible housing encompassing at least one camera. The controller triggers the camera to capture images at predefined intervals. These images are then analyzed by an artificial intelligence (AI) model or a background state change detection script to identify objects of interest, specifically aquatic wildlife. The system provides for efficient use of storage by discarding images where no objects of interest are detected. The controller can also initiate video recording upon the detection of an object of interest. Furthermore, the system incorporates a wireless communications module enabling data transmission to external devices or servers, and user-configurable settings for adjusting capture intervals and image analysis parameters.

20 Claims, 13 Drawing Sheets

(51) Int. Cl.

| | |
|---|---|
| ***G06V 20/05*** | (2022.01) |
| ***H04N 23/60*** | (2023.01) |
| ***H04N 23/617*** | (2023.01) |
| ***H04N 23/661*** | (2023.01) |
| ***H04N 23/667*** | (2023.01) |

(52) U.S. Cl.

CPC ........... *H04N 23/64* (2023.01); *H04N 23/661* (2023.01); *H04N 23/667* (2023.01); *G06V 2201/07* (2022.01)

(56) References Cited

U.S. PATENT DOCUMENTS

| | | | | |
|---|---|---|---|---|
| 2011/0227871 | A1* | 9/2011 | Cannon | G06F 3/0393 345/174 |
| 2013/0107031 | A1* | 5/2013 | Atkinson | H04N 1/00347 348/81 |
| 2015/0116496 | A1* | 4/2015 | Ottaviano | B63B 21/227 348/148 |
| 2015/0183498 | A1* | 7/2015 | Wardle | B63G 8/001 114/337 |
| 2016/0119065 | A1 | 4/2016 | Tobias et al. | |
| 2016/0182778 | A1 | 6/2016 | Kalfas | |
| 2017/0048494 | A1* | 2/2017 | Boyle | G03B 15/03 |
| 2018/0003838 | A1* | 1/2018 | Morris | G01V 1/226 |
| 2018/0132459 | A1* | 5/2018 | Baba | A01K 79/02 |
| 2019/0353985 | A1 | 11/2019 | Austin et al. | |
| 2022/0011428 | A1 | 1/2022 | Brandon | |

FOREIGN PATENT DOCUMENTS

| | | | |
|---|---|---|---|
| EP | 4286265 | A1 | 12/2023 |
| WO | 2009008733 | A1 | 1/2009 |
| WO | 2014060562 | A1 | 4/2014 |
| WO | 2015092351 | A1 | 6/2015 |
| WO | 2019013627 | A1 | 1/2019 |
| WO | 2022075853 | A1 | 4/2022 |

* cited by examiner

CAMERA SYSTEM FOR AQUATIC WILDLIFE MONITORING

FIELD

The present disclosure generally relates to aquatic photography, specifically to a system designed for capturing and analyzing images of aquatic wildlife in their natural environments. The disclosure can utilize automated image capture, wireless data transmission, and an artificial intelligence (AI) based image recognition model for detecting aquatic species within the captured images.

BACKGROUND

In the sphere of aquatic research and wildlife observation, logistical challenges have been a persistent issue. While terrestrial game cameras, otherwise known as camera traps, have been integral to wildlife observation, their implementation in aquatic environments has posed substantial hurdles due to the inability to utilize infrared motion detection techniques. Because of this, novel image-capturing and processing techniques are necessary.

The underwater photography systems of the present largely hinge on manual operations for controlling the camera, storing images, and subsequently reviewing the footage. This process often culminates in a considerable accumulation of data that is yet to be filtered, making it time-consuming for researchers to manually sift through the large volume of footage to spot and document instances of aquatic life.

Such systems also necessitate regular physical retrieval for extracting data and replacing batteries, an approach that is both labor-intensive and potentially disruptive to the aquatic ecosystem under observation.

Another notable limitation of the existing systems is the lack of real-time data analysis and alert capabilities. Consequently, when a significant event takes place, such as the sighting of a particular species or the presence of a school of fish, these systems are unable to alert researchers in real-time, leading to crucial observations being delayed until the footage is retrieved and analyzed.

A major drawback of many current systems is the absence of image analysis to determine when events of interest have occurred. Whether this is done via an onboard system or on the cloud, image analysis technology can be used to determine when events of interest occur (i.e., a fish has swum in front of the camera).

Despite the contributions of existing technology, it's clear that current methods and systems of observing aquatic wildlife have their shortcomings. A significant amount of human intervention is required for operating the camera system, retrieving data, and replacing batteries. The continuous data-capturing process leads to an excessive accumulation of unfiltered data, which is time-consuming and difficult to process manually. Further, the limited battery life of these systems restricts the continuous operation of the camera in remote settings.

The absence of real-time alerts in existing systems means that they lack the capability to instantly inform researchers about significant observations. This leads to potential delays in recording crucial findings until the footage is retrieved and analyzed. The difficulty in transmitting data through water further exacerbates these issues, limiting real-time data transmission and remote access to the captured data.

Given these challenges, there's a pressing need for an enhanced method and system that can efficiently capture, process, and analyze images of aquatic environments with minimal manual intervention while maximizing real-time interactions and data accessibility. This invention seeks to resolve these issues by proposing a fully automated underwater camera system capable of capturing and analyzing images at set intervals, identifying aquatic species via an AI-based model, and transmitting data and alerts wirelessly to end-user devices or servers. It is within this context that the present invention is provided.

SUMMARY

According to this disclosure, a camera system can be provided for capturing images within an aquatic environment that can comprise one or more external end-user devices as well as one or more servers. The system can include a sealed submersible housing that can include at least one camera, a memory storage device, a controller configured to trigger the camera to capture images, and a serializer that can be in communication with a deserializer. This system can further include a communication cable that may be disposed between the sealed submersible housing and a second housing that has within the deserializer, a power source, a wireless communications module that can be configured to facilitate transmission of data to the one or more of the end-user devices or servers. In such a system, there may be a controller or the one or more servers that may be able to analyze a captured image with a background state change detection script or an artificial intelligence model configured to perform image analysis and object detection to identify objects of interest; such as aquatic wildlife.

Some variations of the above embodiments may include a sealed submersible housing that can have two cameras, wherein the two cameras are oppositely opposed. Or where the controller may be configured to trigger the camera to capture images at set intervals. Or where the wireless communications can be configured to communicate via LTE, Wi-Fi, or Bluetooth communication networks.

Other variations of the above embodiments may include a controller that can be configured to analyze each captured image individually after it is captured. Or where the controller can be configured to analyze batches of captured images after a predetermined number of images have been captured. Or where the controller can be configured to transmit batches of captured images to the one or more external servers for image analysis after a predetermined number of images have been captured.

Further variations of the above embodiments can include submersible housing that may also include a bottom referencing mechanism coupled to the underside of the submersible housing. Or where the bottom referencing mechanism can include a weighted anchor that may have a central point and a plurality of radially arranged arms. Or where a plurality of radially arranged arms can include a set of first mounting points positioned at their outer ends.

Additionally, according to this disclosure, there can be a method for analyzing images of wildlife in an aquatic environment that can include the steps of providing a camera system similar to the embodiment described supra, where it may take the step of capturing an image at a set interval of time with the camera system. This can be followed by the step of compressing the image with the serializer and the step of transmitting the image via the communication cable to the deserializer and may be followed by the step of processing the image with a detection script or artificial intelligence model to identify objects of interest.

Some variations of the above method may include a controller that can analyze the image to determine the presence of the object of interest and subsequently to the capturing of the image. In such a variation, the controller may also store a set number of images. Where in some instances, the controller may analyze the set number of images to determine the presence of objects of interest. Or, the controller may transmit the set number of images to the one or more external servers, where the servers may then determine the presence of the objects of interest by applying the detection script or artificial intelligence model.

Other variations of the above method may include the further step of sending a notification to the one or more external devices. Or where a notification can be sent to the one or more external end-user devices.

Additionally, the above methods may include the further step of initiating a video recording when the object of interest is detected.

The above summary is not intended to describe each and every example or every implementation of the disclosure. The description that follows more particularly exemplifies various illustrative embodiments

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings Various embodiments of the invention are disclosed in the following detailed description and accompanying drawings.

Figure 1:
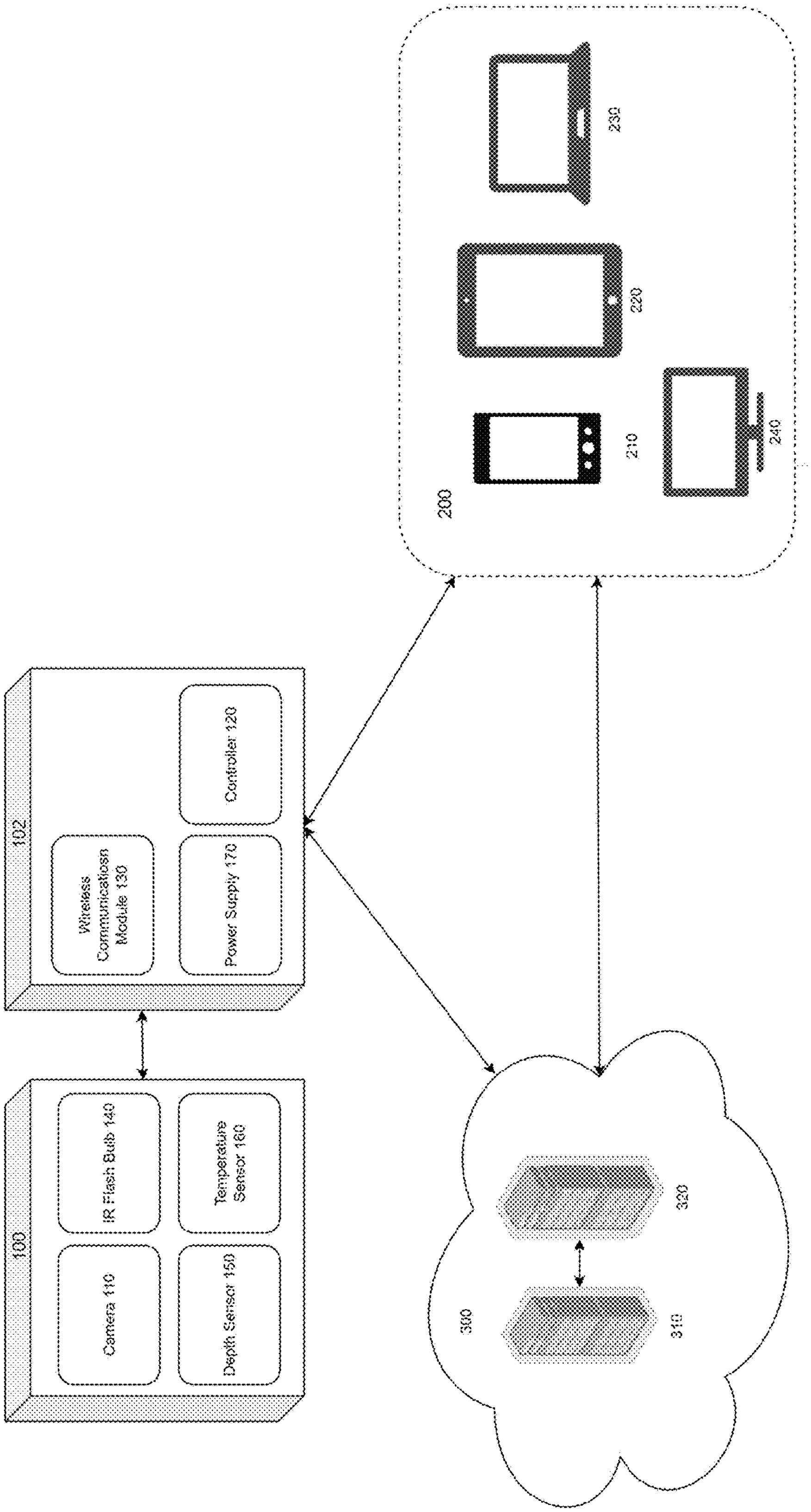
FIG. 1 is a high-level system schematic diagram of the disclosed aquatic wildlife camera system.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

The present disclosure relates to a camera system designed for aquatic environments, and more particularly to such a camera system designed for aquatic environments that can include dual housings where a submerged housing can contain dual opposing cameras. Various embodiments are described in detail with reference to the drawings, in which like reference numerals may be used to represent like parts and assemblies throughout the several views. Reference to various embodiments does not limit the scope of the systems and methods disclosed herein. Examples of construction, dimensions, and materials may be illustrated for the various elements; those skilled in the art will recognize that many of the examples provided have suitable alternatives that may be utilized.

Any examples set forth in this specification are not intended to be limiting and merely set forth some of the many possible embodiments for the systems and methods. As used herein, the singular forms "a," "an," and "the" are intended to include the plural forms as well as the singular forms unless the context clearly indicates otherwise. As used herein, the term "and/or" includes any combinations of one or more of the associated listed items. It is understood that various omissions and substitutions of equivalents are contemplated as circumstances may suggest or render expedient. Still, these are intended to cover applications or embodiments without departing from the disclosure's spirit or scope. Also, it is to be understood that the phraseology and terminology used herein are for the purpose of description and should not be regarded as limiting.

FIG. 1 is a high-level schematic that provides an overview of the primary components of the disclosed camera system for capturing images of aquatic environments and wildlife.

The core component of the system, as shown in the center of FIG. 1, can be a sealed submersible housing 100. This housing can be designed to be submersible and durable, capable of withstanding the harsh conditions of underwater environments. Its purpose can be to protect and contain the essential hardware components of the camera system.

Contained within the submersible housing 100 can be several components. For example, a primary component can be a camera or multiple cameras 110 that may be configured to capture images underwater at predefined intervals. The camera's lens may be positioned to have an optimal field of view for capturing images of aquatic wildlife and the surrounding environment.

Other components that can be included within the submersible housing 100 may be a depth sensor 150 and/or a temperature sensor 160. The depth sensor 150 measures the depth of the water where the housing 100 is located, and the temperature sensor 160 measures the water temperature. These sensors can provide additional environmental, location, and direction data that the controller 120 associates with each captured image.

Adjacent to the camera lens within the submersible housing 100 can be an infrared (IR) flashbulb 140, or another IR light emitting device. This component can facilitate the capturing of clear images in low-light conditions often found in aquatic environments. The submersible housing 100 can be physically and communicatively coupled, in the present non-limiting embodiment, to a processor housing 102. The processor housing 102 can generally be positioned on shore or floating in a buoy near the submerged submersible housing 100 and may further facilitate complex communications and processing operations. In some embodiments, the processor housing 102 may be a buoy itself.

The processor housing 102 can contain the controller 120. The controller 120 may govern the operational logic of the system, triggering the camera 110 to capture images at set intervals. Depending on how the overall system is configured, the controller may also perform processing on these images using an artificial intelligence model or a background state change detection script.

The controller 120 may be connected to a wireless communications module 130, which may also be housed in the processor housing 102 alongside a power supply 170. A wireless communications module 130 may also be present in the processor housing 102, wherein the wireless communications module 130 may enable the system to communicate with external devices or a server(s) over a network. The wireless communications module 130 may also support LTE, Wi-Fi, and Bluetooth communication protocols.

Having the controller 120, wireless communications module 130, and power supply 170 housed in the processor housing 102 above the surface of the water body where the submersible housing 100 can be submerged may ensure these more water-sensitive components are kept dry and facilitate easier transmission of wireless signals. However, in some examples, these components may also be disposed within the submersible housing 100.

A set of end-user devices 200 is illustrated where they can be in communication with the processor housing 100; such end-user devices can include a smartphone 210, a tablet 220, a laptop 230, or a television 240. These devices can receive notifications and images from the camera system via the wireless communications module 130 when an object of interest is detected. Users may be able to adjust the system settings through a dedicated application installed on these devices.

A cloud network architecture 300 can also be represented in communication with both the processor housing 100 and the end-user devices 200. This can, at times, include a set of servers 310 connected to a database 320. The servers 310 can receive and process image data from the camera system, as well as, store images and data in the database 320, and may also provide an online platform for users to view and analyze the stored images. The cloud network architecture 300 may facilitate large-scale data storage and powerful computational analysis that may be beyond the capabilities of the controller 120 in the submersible housing 100.

Figure 2:
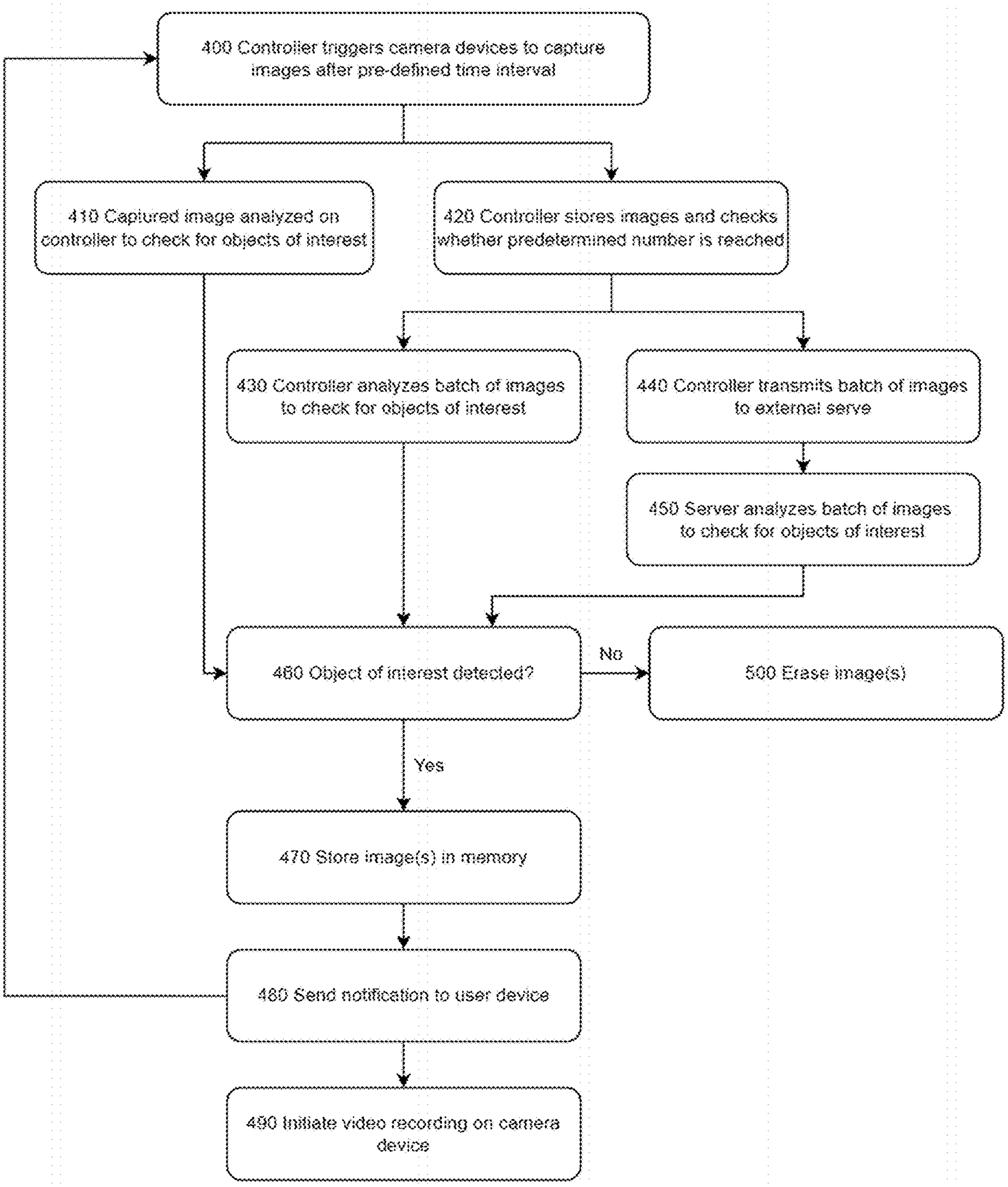
FIG. 2 is a process flow diagram illustrating different operational embodiments that the camera system can execute.

FIG. 2 is a process flow diagram illustrating several embodiments of the operational procedure of the camera system depending on its configuration. This flow chart clarifies how the system's components can work together to capture, analyze, and manage images depending on the presence of objects of interest, for instance, aquatic wildlife.

This flow chart can begin with the controller 120 inside the processor housing 102, which, as per a user-defined time interval, can trigger the camera 110 in the submersible housing 100 to capture images of step 400. This can be the first stage of the process and can also be a continuous operation. Following image capture, the diagram illustrates three potential paths depending on the configuration of the system.

In the first path, each captured image can be analyzed directly on the controller at step 410. Using an artificial intelligence model or a background state change detection script, the system may identify whether any objects of interest are present in the image.

In the second and third paths, the controller may store images until a predetermined number is reached at step 420.

In the second path, once this threshold is met, the batch of images may be analyzed together on the controller at step 430, checking for the presence of objects of interest.

In the third path, instead of analyzing the images on the controller, the batch of images can be transmitted via the wireless communications module 130 to an external device at step 440, such as a server 310, for analysis using a similar object detection model as step 450.

In all three paths, if an object of interest is identified at a decision point 460, the relevant image or batch of images can be saved in a memory storage at step 470. Following this, a notification can be sent at step 480 to an end-user device 200, wherein the end-user device 200 can be a smartphone 210, a tablet 220, or a laptop 230, or to at least one server 310 for online platform access. This notification may include the image itself.

Optionally, the controller may also initiate a video recording at step 490 in response to the detection of an object of interest. This video can be stored in the controller's memory and may be transmitted to the servers for platform access in the same manner as the images.

If no object of interest is found at the decision point 460, the image or batch of images can be erased in step 500, optimizing memory and data usage.

An additional embodiment may provide a user with the ability to initiate a live-stream video from the device to an end-user device. This embodiment may not require the system to analyze the acquired images for detection of aquatic wildlife; thus, the end-user can have full control over the system at any time they desire.

There can be various object detection models that can be utilized by the disclosed camera system for identifying aquatic wildlife within the captured images. These models can be trained to recognize a wide variety of aquatic species and discern them from the background.

TensorFlow® supports a wide range of Application Programming Interfaces APIs, and allows for flexible architecture designs, making it suitable for building and training different types of object detection models, including Convolutional Neural Networks (CNNs), Region-based Convolutional Neural Networks (R-CNNs), and Single Shot MultiBox Detector (SSD). There are many other examples of libraries that may also be suitable for developing models for building and training detection models.

Convolutional Neural Networks (CNNs): These models are particularly well-suited to image analysis tasks due to their capability to process and interpret spatial hierarchies in image data. CNNs are built on the principle of convolution operations, which allows them to extract features from the image and recognize patterns that can differentiate aquatic wildlife from the surrounding environment. CNNs are also translation-invariant, meaning they can recognize a species regardless of its position in the image, a crucial feature for wildlife identification where the subject may appear anywhere within the camera's field of view. To effectively identify aquatic wildlife, CNNs can be trained on a substantial dataset of labeled images, where each image can be marked with the species present in it.

Region-based Convolutional Neural Networks (R-CNNs): These are an extension of CNNs that not only identify the species present in an image but also provide a bounding box around the identified subject. R-CNNs are highly accurate and efficient for object detection tasks, making them suitable for detecting aquatic wildlife. They function by proposing regions within an image where the presence of an object is likely and then applying a CNN to these proposed regions to identify the objects. This approach may ensure that the entirety of the image is scanned for potential wildlife presence. Similar to CNNs, R-CNNs can be trained on labeled images where the species and their locations within the images are specified.

You Only Look Once (YOLO): Building a YOLO model with TensorFlow® involves framing the object detection as a regression problem, which can be efficiently handled by the framework's robust suite of mathematical and matrix operation capabilities. TensorFlow's® support for real-time operations and optimization algorithms also makes it suitable for training YOLO models, which require quick image processing.

Single Shot MultiBox Detector (SSD): This model can be another suitable option for real-time object detection. Like YOLO, SSD processes an entire image in a single pass to identify objects, but it generates a different aspect ratio for each default bounding box at different feature map scales, making it a bit more accurate at identifying objects of varying sizes within an image. This feature can be crucial for detecting a wide range of aquatic wildlife that can vary greatly in size.

Each of these models requires a labeled dataset for training, which would ideally consist of many examples of aquatic wildlife in various poses, sizes, lighting conditions, and environmental contexts. The models learn to recognize the distinguishing features of different species from these training examples and can then use this learned knowledge to identify wildlife in new images captured by the camera system.

Figure 3A:
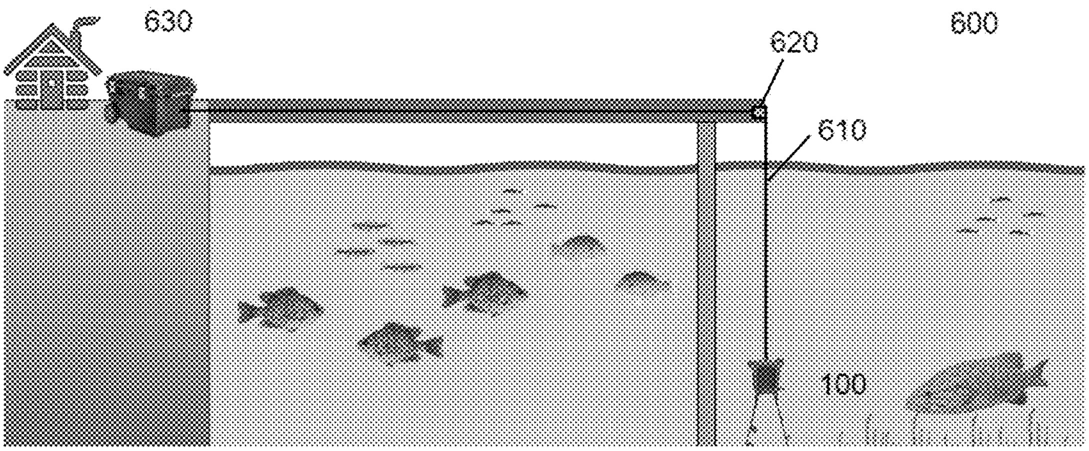
FIG. 3A is an illustrated diagram of a first example configuration of an underwater monitoring system according to the present disclosure.
Figure 3B:
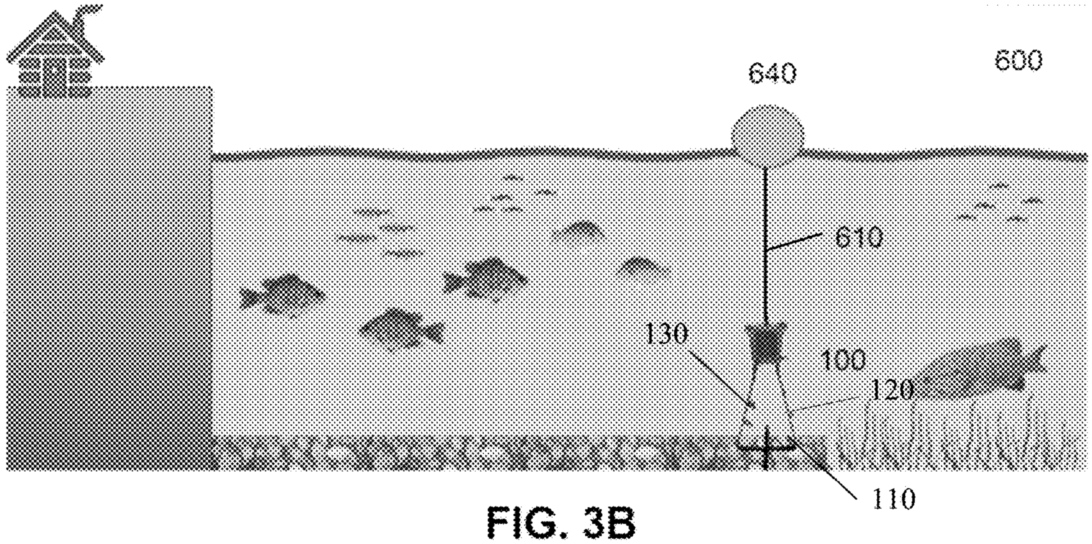
FIG. 3B is an illustrated diagram of a second example configuration of the underwater monitoring system according to the present disclosure.
Figure 3C:
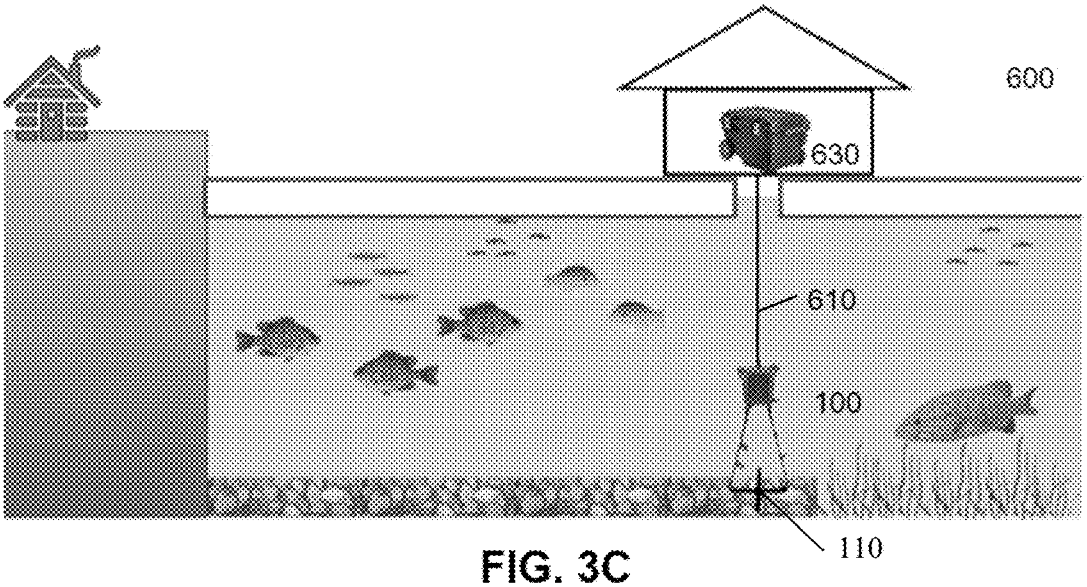
FIG. 3C is an illustrated diagram of a third example configuration of the underwater monitoring system according to the present disclosure.

Turning back to the physical construction of the system, various mechanisms can be used to house the processor and battery, as shown in FIG. 3A, FIG. 3B, and FIG. 3C, which illustrates diagrams of various example configurations of the underwater monitoring system 600 according to the present disclosure where the system comprises a wired connection 610 of adjustable length coupling it the controller in the submersible housing 100 to an anchor point positioned above. In some embodiments, the submersible housing 100 can be tethered to a bottom referencing mechanism 110, described in detail below. The bottom referencing mechanism 110 may be connected to the submersible housing 100 via a cable assembly 120, which may comprise a pair of closed loops 130 threaded therein.

In all illustrated configurations, the top of the submersible housing 100 can have a cable 610 that runs to a processor housing 630/640, where the controller and wireless communications module are housed. However, it should be noted that other configurations where no processor housing is used, and all of the electrical components are housed within the submersible housing are possible.

Additionally, these systems illustrated in FIG. 3A, FIG. 3B, and FIG. 3C may further include a serializer and a deserializer, where the serializer can be located in the submersible housing 100 and can be in communication with the wired connection 610 and where the deserializer can be located in the processor housing 630/640 and also be in communication with the wired connection 610.

Traditionally, analog camera video transmission formats may place a limit on the maximum camera resolution that can be used. The present system can use a high-resolution digital cameras to provide superior imaging. Digital camera interfaces can use a large number of signals (wires) for their connection, and that can be a problem when sending images over long distances.

Regarding the serializer and deserializer, these devices can comprise a chipset that can combine all of the digital signals from the submersible housing 100 to the processor housing 630/640 into a single, bi-directional, high-frequency signal that can be essentially transparent to the camera sending the signal and the System on Module (SOM) that can receive the signal. Such a serialized data stream may be able to simultaneously provide a transparent tunnel to additional digital interfaces that may be embedded in the system as well as electrical power. It can do this through a single coax cable, for example, the wired connection 610.

The use of a serializer with some embodiments of the methods disclosed herein may provide energy efficiency and cost savings, as the serializer method can significantly reduce the power needed to transfer data over the length of the wired connection 610. This serializer/deserializer methodology may be able to provide the embodiments described herein with the capability to have a separation distance of the submersible housing 100 to the processor housing 630/640 up to at least 44 meters without any signal loss. Greater separation distance may require the inclusion of a repeater being disposed somewhere on the length of the wired connection 610. The serializer/deserializer connection can be a full-duplex. It may run at a frequency that is higher than the camera interface and may be able to continuously send compressed packets in both directions to facilitate this full duplex connection.

In FIG. 3A, the anchor point is a device 620 attached to a dockside, which in turn can be coupled to a secondary housing 630, which can contain a more powerful controller for processing images and other data sensed by the submersible housing 100. In FIG. 3B, the anchor point can be a buoy 640 floating on the water surface; it is contemplated that the secondary housing 630 may be a buoy itself. In FIG. 3C, the anchor point can be a secondary housing 620 disposed on an ice shelf and/or within a structure in an ice house, on an ice shelf.

Figure 4A:
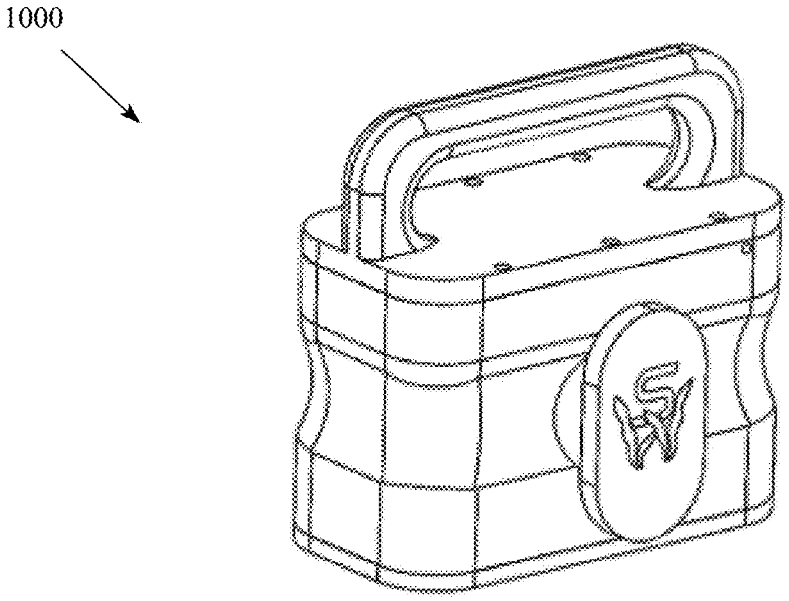
FIG. 4A is a perspective view of an embodiment of a processor housing of an underwater monitoring system.
Figure 4B:
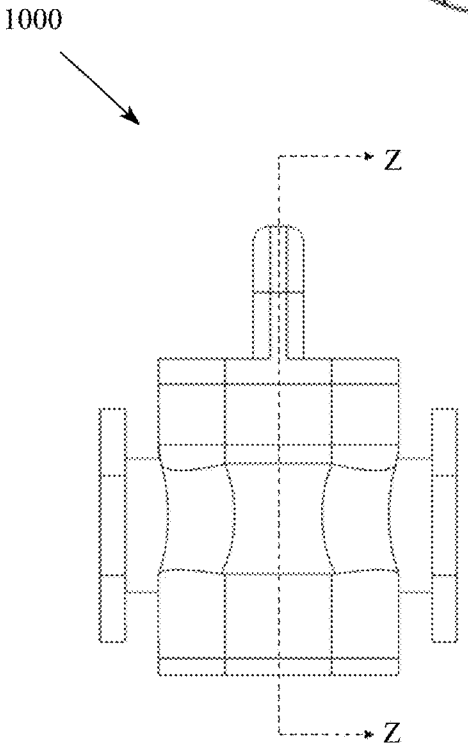
FIG. 4B is a side view of an embodiment of a processor housing of an underwater monitoring system.
Figure 4C:
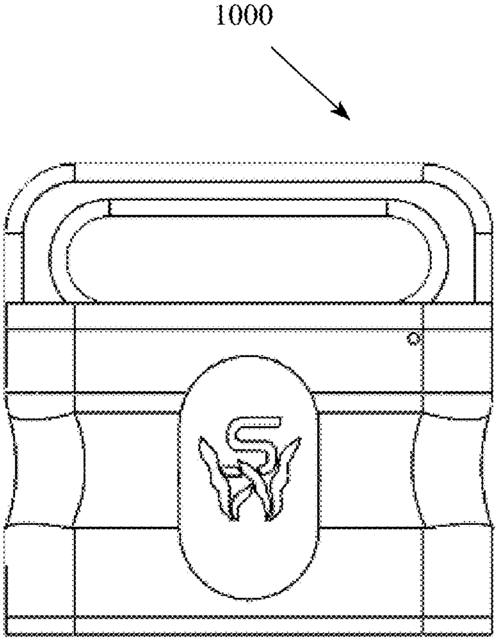
FIG. 4C is a front view of an embodiment of a processor housing of an underwater monitoring system.
Figure 5:
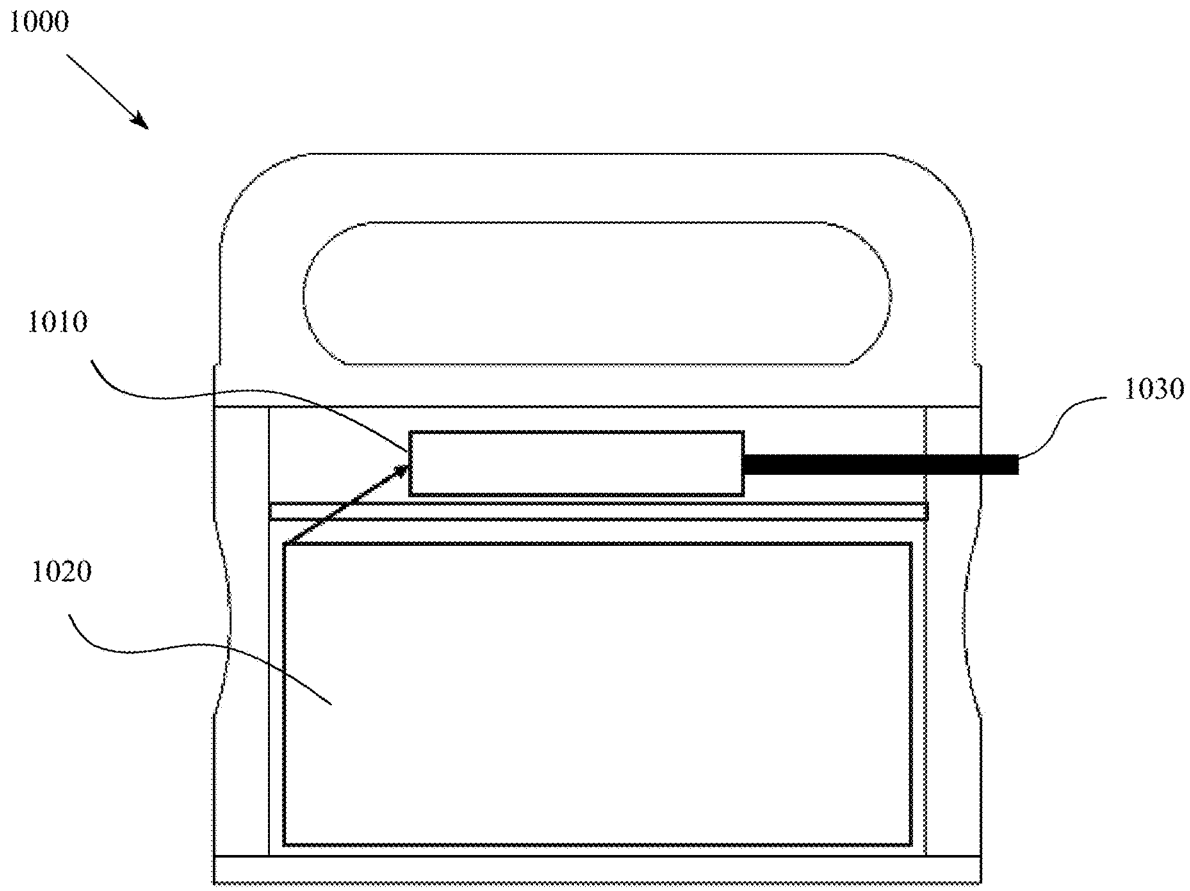
FIG. 5 is a cross-section view of the embodiment in FIG. 4B on line Z.

Regarding FIGS. 4A, 4B, and 4C, this is an illustrative example of a processor housing 1000. FIG. 5 is a cross-sectional view of line Z in FIG. 4B. Within the embodiment of FIG. 5 is an example of the arrangement of a printed circuit board 1010, which can comprise a communication module, a deserializer, and a connection to a data cable 1030. the data cable 1030 may be in further communication with a submersible housing (not shown). Such an embodiment may also include a power supply 1020, which may be a 12V battery or other such power supplies known in the art.

Figure 6A:
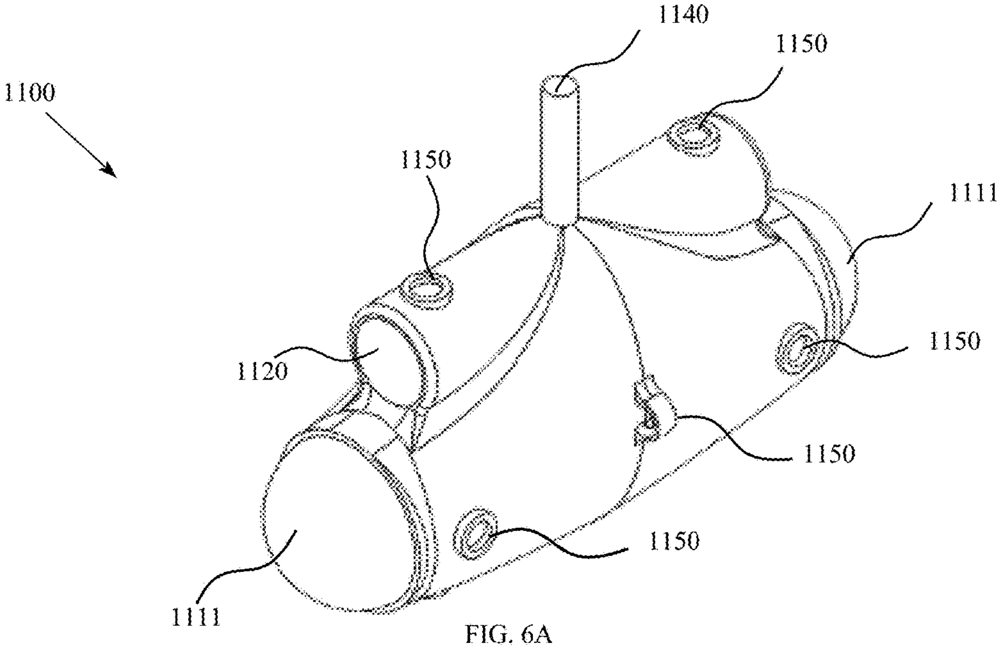
FIG. 6A is a perspective view of an embodiment of an underwater housing of an underwater monitoring system.
Figure 6B:
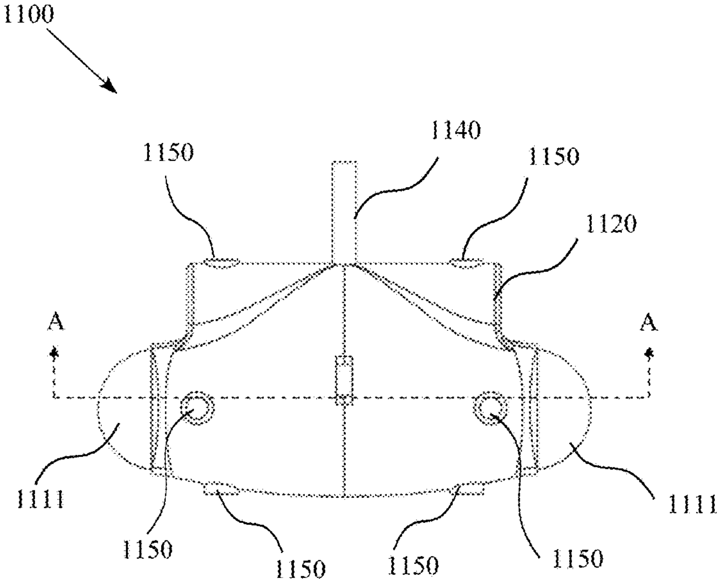
FIG. 6B is a front view of an embodiment of an underwater housing of an underwater monitoring system.
Figure 6C:
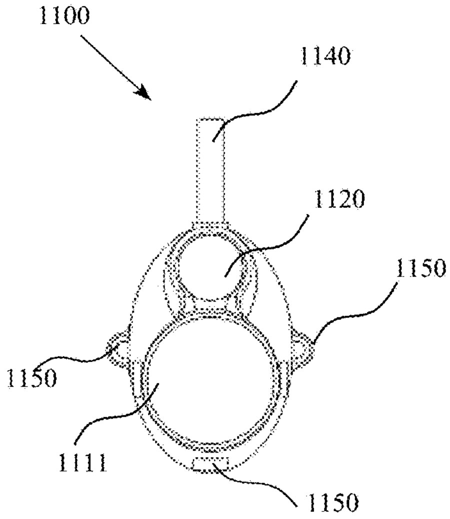
FIG. 6C is a side view of an embodiment of an underwater housing of an underwater monitoring system

Regarding FIGS. 6A, 6B, and 6C, this is an illustrative example of a submersible housing 1100. In such an embodiment of the submersible housing 1100, there can be a data cable 1140 that is in communication with a processor housing (not shown) similar to the processor housing 1000 of FIGS. 4A, 4B, 4C, and 5. The submersible housing 1100 may also include at least one camera cover 1111, which may also act as a lens for a camera disposed behind the camera cover 1111 within the submersible housing 1100. The submersible housing 1100 can also include an IR illuminator 1120 and several anchor mounts 1150, where the anchor mounts 1150 can be tethered to an anchor (not shown), which may prevent the submersible housing 1100 from freely rotating, thereby allowing a camera disposed behind any camera cover 1111 to maintain a consistent field of view.

Figure 7:
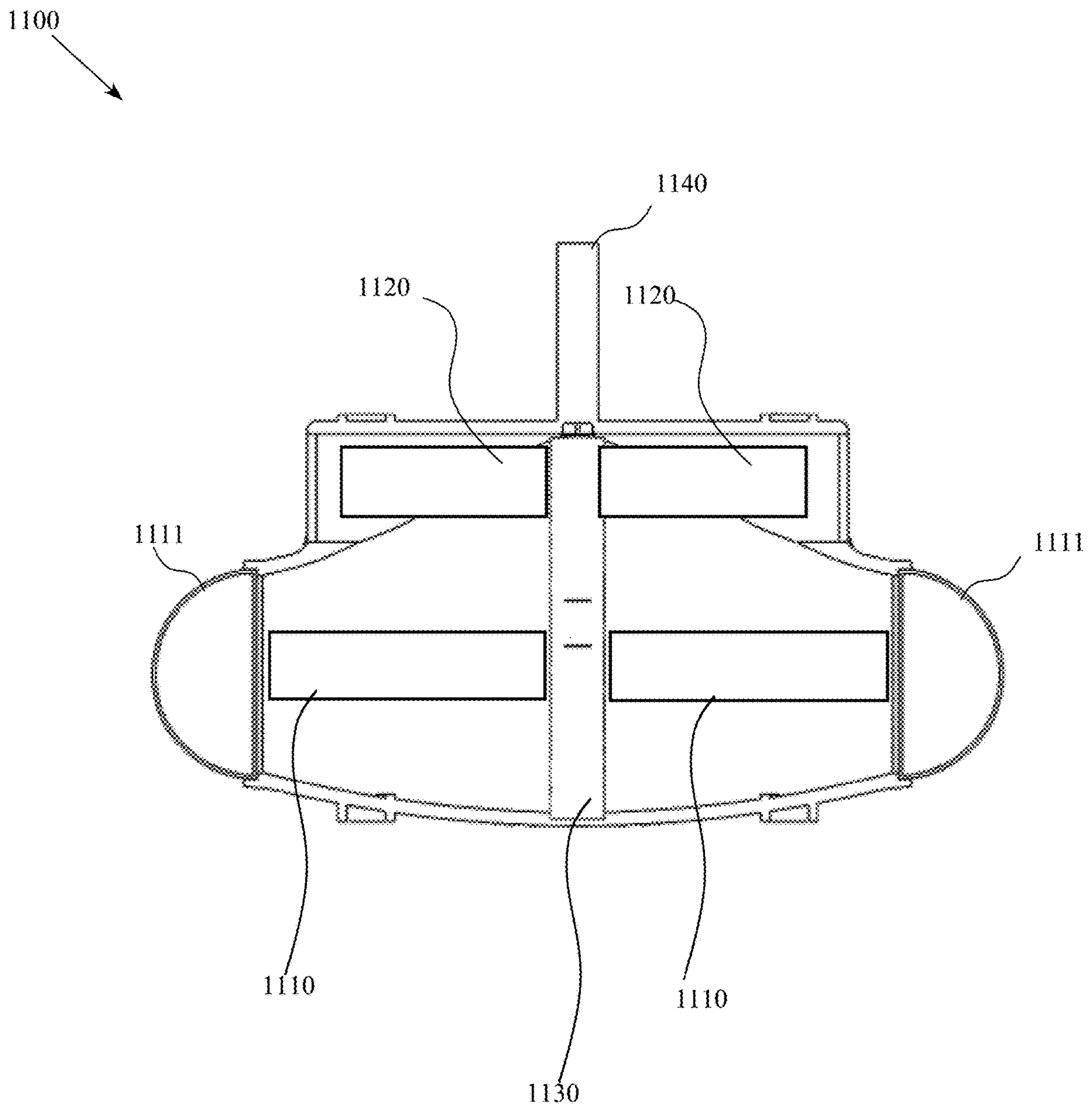
FIG. 7 is a cross-section view of the embodiment in FIG. 6B on line A.

FIG. 7 is a cross-sectional view of line A in FIG. 6B. Within the embodiment of FIG. 7 is an example of the arrangement within an embodiment of the submersible housing 1100. In such an embodiment, there may be two oppositely opposed cameras 1110. Such a camera arrangement can provide a field of view of about 240°. Further, within this embodiment, there may be two oppositely opposed IR illuminators 1120 that are in line with the cameras 1110 and are configured to work in conjunction with the cameras 1110. Both the cameras 1110 and the illuminators 1120 can be in communication with a printed circuit board (PCB) 1130. The PCB 1130 may further include a connection to the data cable 1140, which may provide communication to a processor housing (not shown) similar to the processor housing 1000. The PCB 1130 can also include a serializer and/or sensors as described supra.

Figure 8A:
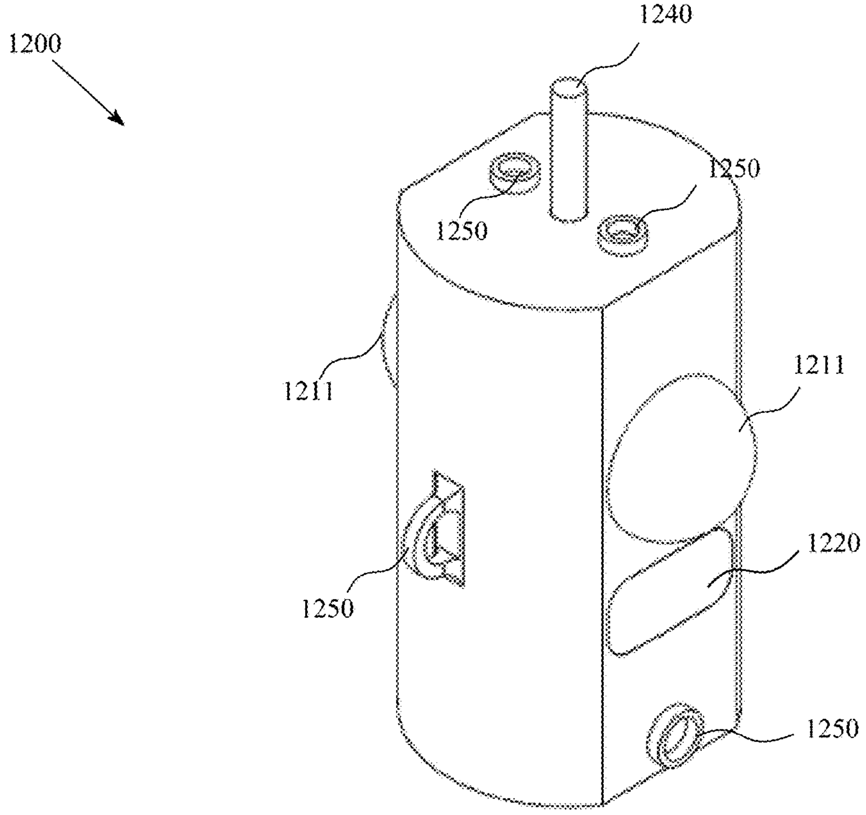
FIG. 8A is a perspective view of another embodiment of an underwater housing of an underwater monitoring system.
Figure 8B:
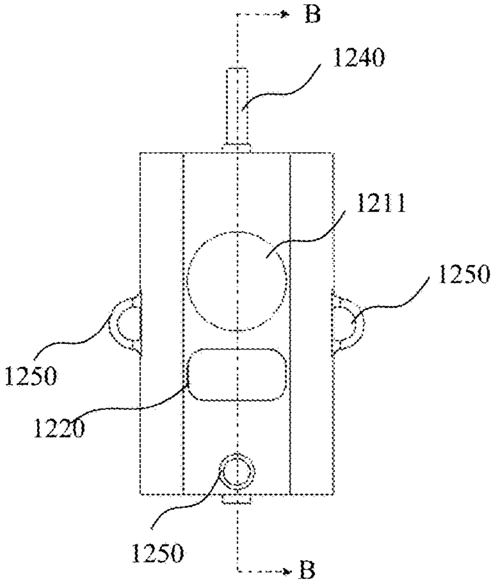
FIG. 8B is a front view of another embodiment of an underwater housing of an underwater monitoring system.
Figure 8C:
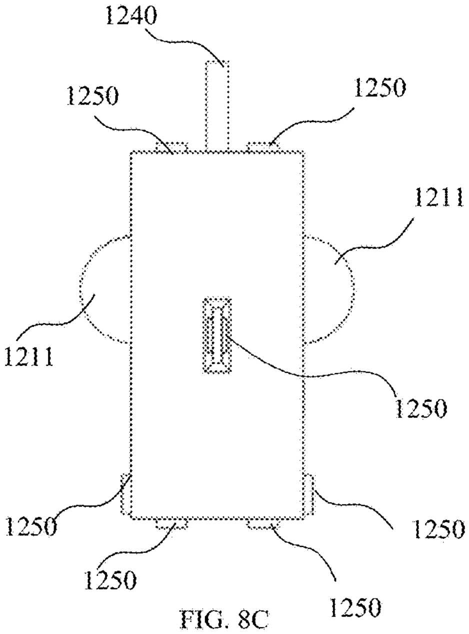
FIG. 8C is a side view of another embodiment of an underwater housing of an underwater monitoring system

Regarding FIGS. 8A, 8B, and 8C, this is another illustrative example of a submersible housing 1200. In such an embodiment of the submersible housing 1200, there can be a data cable 1240 that is in communication with a processor housing (not shown) similar to the processor housing 1000 of FIGS. 4A, 4B, 4C, and 5. The submersible housing 1200 may also include at least one camera cover 1211, which may also act as a lens for a camera disposed behind the camera cover 1211, within the submersible housing 1200. The submersible housing 1200 can also include an IR illuminator 1120 and several anchor mounts 1150, where the anchor mounts 1250 can be tethered to an anchor (not shown), which may prevent the submersible housing 1200 from freely rotating, thereby allowing a camera disposed behind any camera cover 1211 to maintain a consistent field of view.

Figure 9:
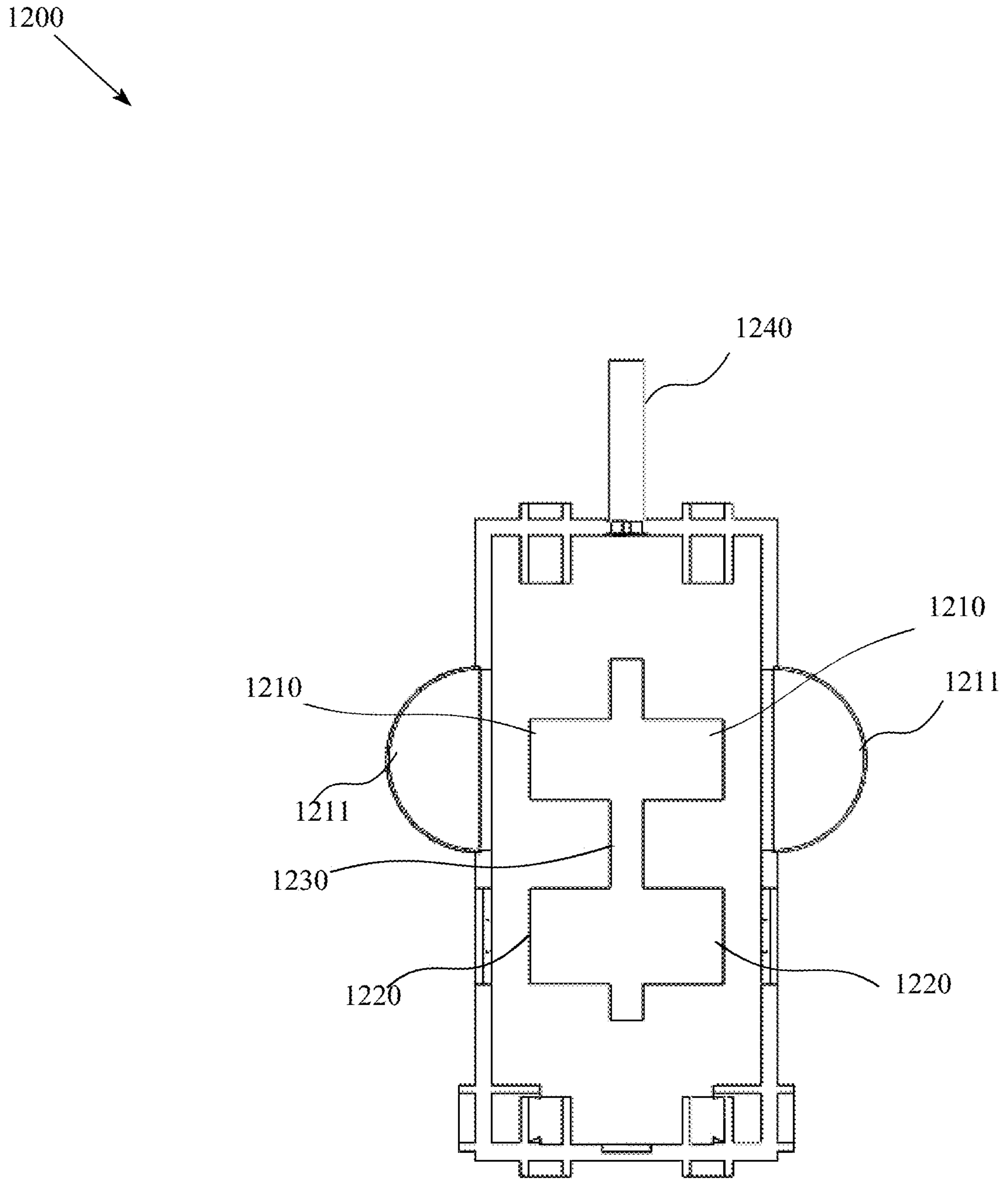
FIG. 9 is a cross-section view of the embodiment in FIG. 8B on line B.

FIG. 9 is a cross-sectional view of line B in FIG. 8B. Within the embodiment of FIG. 9 is an example of the arrangement within an embodiment of the submersible housing 1200. In such an embodiment, there may be two oppositely opposed cameras 1210. Such a camera arrangement can provide a near 360° field of view. Further, within this embodiment, there may be two oppositely opposed IR illuminators 1220 that are in line with the cameras 1210 and are configured to work in conjunction with the cameras 1210. Both the cameras 1210 and the illuminators 1220 can be in communication with a printed circuit board (PCB) 1230. The PCB 1230 may further include a connection to the data cable 1240, which may provide communication to a processor housing (not shown) similar to the processor housing 1000. The PCB 1230 can also include a serializer and/or sensors as described supra.

Figure 10A:
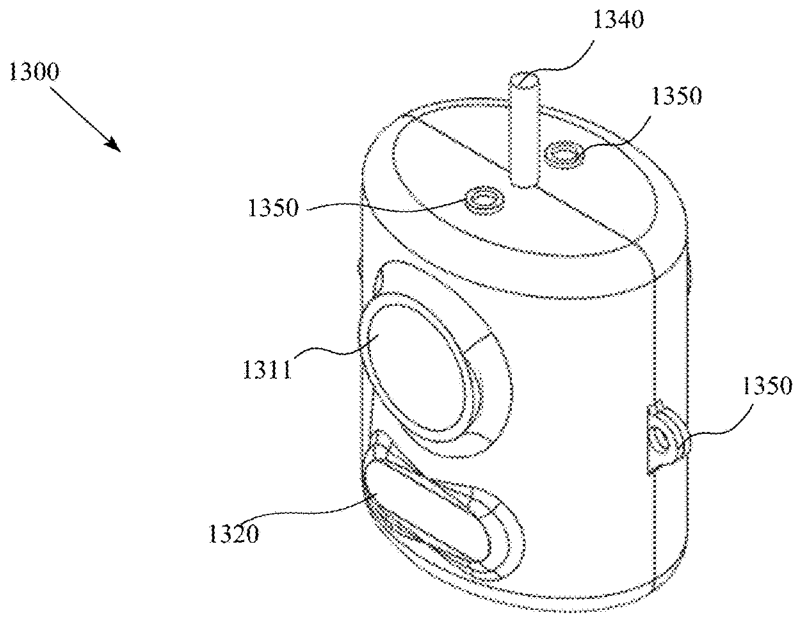
FIG. 10A is a perspective view of another embodiment of an underwater housing of an underwater monitoring system.
Figure 10B:
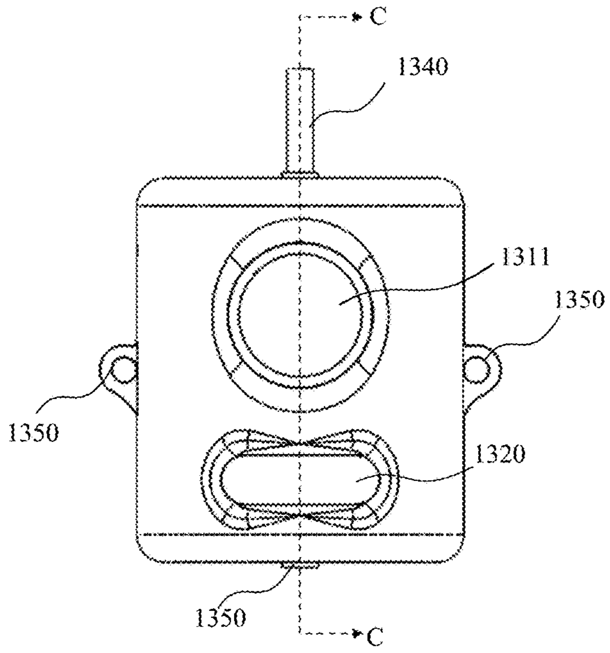
FIG. 10B is a front view of another embodiment of an underwater housing of an underwater monitoring system.
Figure 10C:
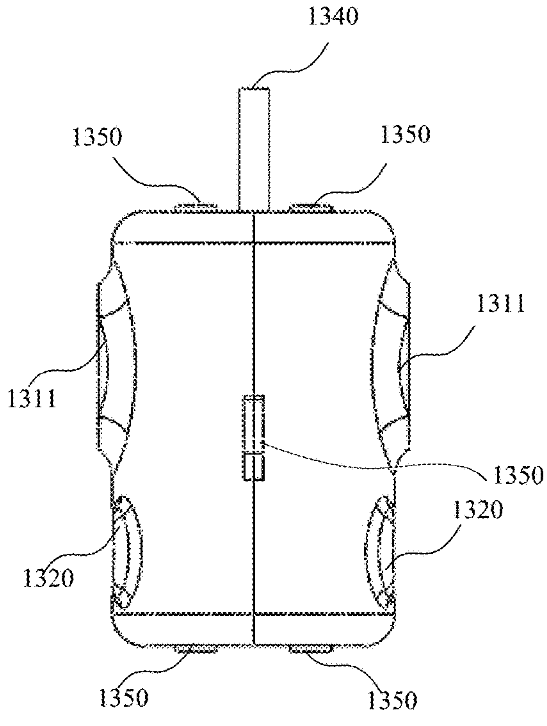
FIG. 10C is a side view of another embodiment of an underwater housing of an underwater monitoring system.
Figure 11:
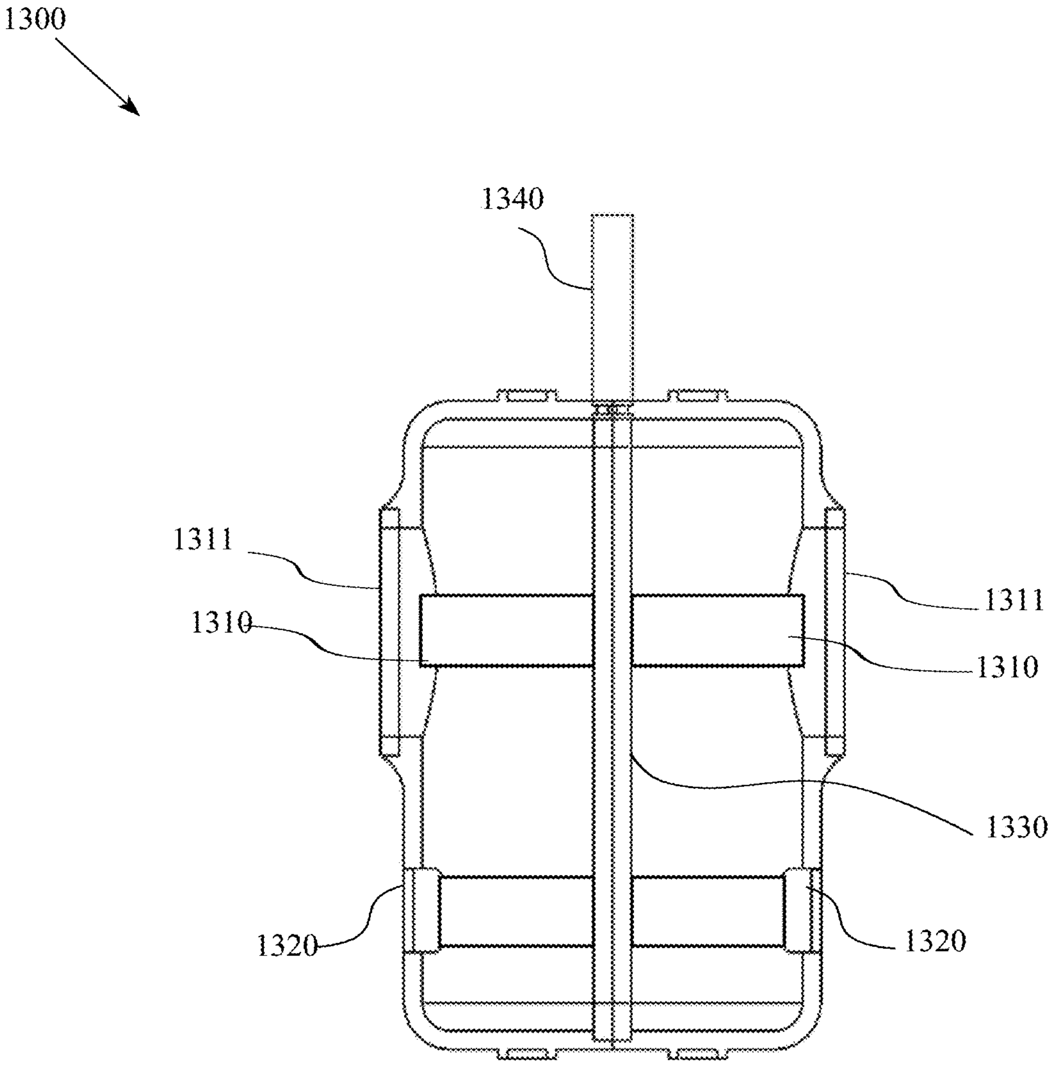
FIG. 11 is a cross-section view of the embodiment in FIG. 10B on line C.

Regarding FIGS. 10A, 10B, and 10C, this is a further illustrative example of a submersible housing 1300. In such an embodiment of the submersible housing 1300, there can be a data cable 1340 that is in communication with a processor housing (not shown) similar to the processor housing 1000 of FIGS. 4A, 4B, 4C, and 5. The submersible housing 1300 may also include at least one camera cover 1311, which may also act as a lens for a camera disposed behind the camera cover 1311, within the submersible housing 1300. The submersible housing 1300 can also include an IR illuminator 1320 and several anchor mounts 1350, where the anchor mounts 1350 can be tethered to an anchor (not shown), which may prevent the submersible housing 1300 from freely rotating, thereby allowing a camera disposed behind any camera cover 1311 to maintain a consistent field of view.

FIG. 9 is a cross-sectional view of line B in FIG. 8B. Within the embodiment of FIG. 9 is an example of the arrangement within an embodiment of the submersible housing 1300. In such an embodiment, there may be two oppositely opposed cameras 1310. Such a camera arrangement can provide a near 360° field of view. Further, within this embodiment, there may be two oppositely opposed IR illuminators 1320 that are in line with the cameras 1310 and are configured to work in conjunction with the cameras 1310. Both the cameras 1310 and the illuminators 1320 can be in communication with a printed circuit board (PCB) 1330. The PCB 1330 may further include a connection to the data cable 1340, which may provide communication to a processor housing (not shown) similar to the processor housing 1000. The PCB 1330 can also include a serializer and/or sensors as described supra.

Figure 12:
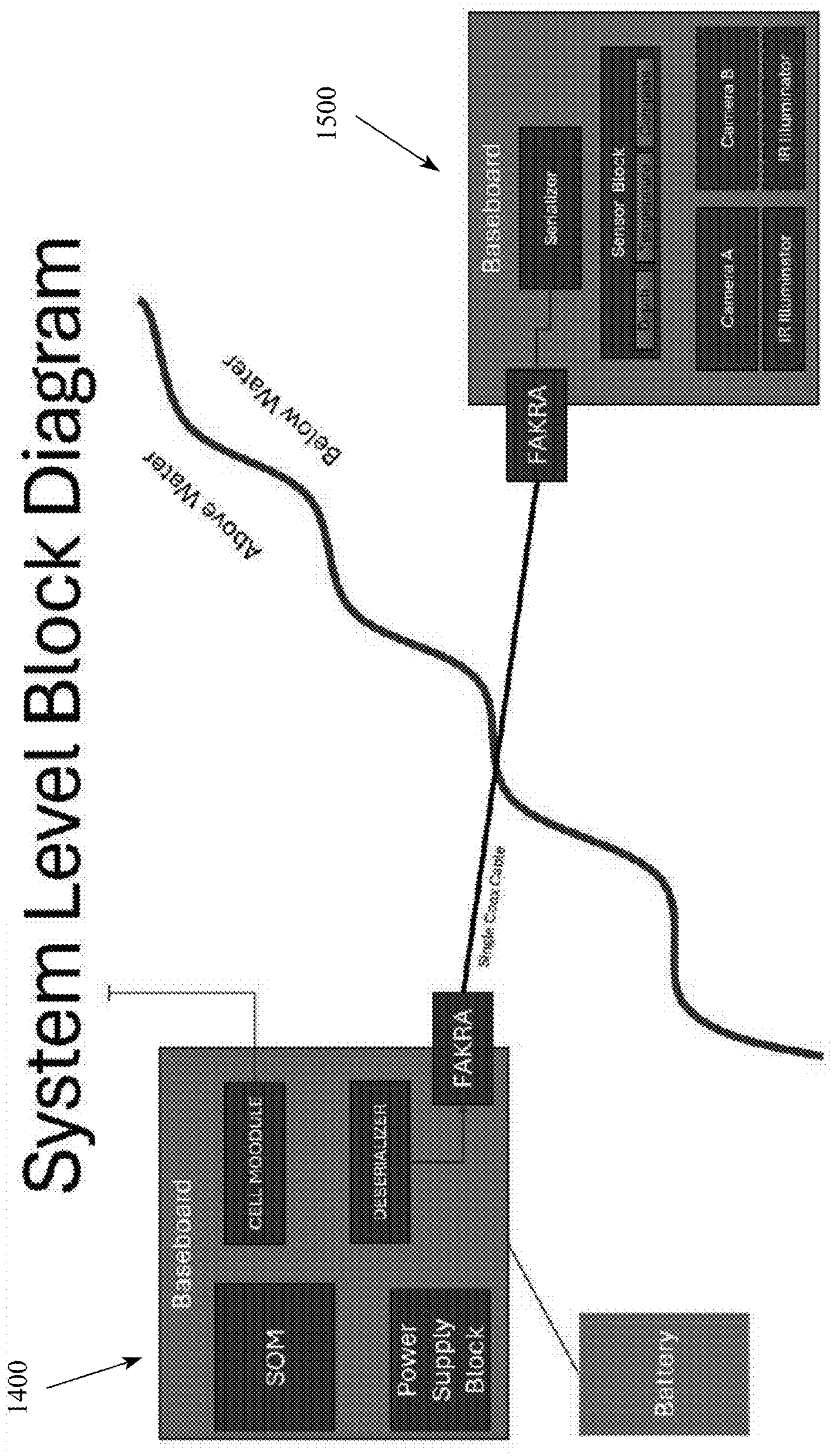
FIG. 12 is a block diagram of an embodiment of the underwater monitoring system, including the water level.

Regarding FIG. 12, here, an illustration is provided that can be an overall block diagram of the systems described supra. Here, processor housing 1400 can contain an SOM along with a power supply, a cellular communication module (for LTE transmission and reception), a deserializer, and a connection to a data cable, here being a FAKRA connector. Additionally, the submersible housing 1500 can include at least two cameras, two IR illuminators, a sensor block, and a serializer. The submersible housing 1500 may also include communication to a data cable via a FAKRA connector; other connectors can be substituted.

Figure 13:
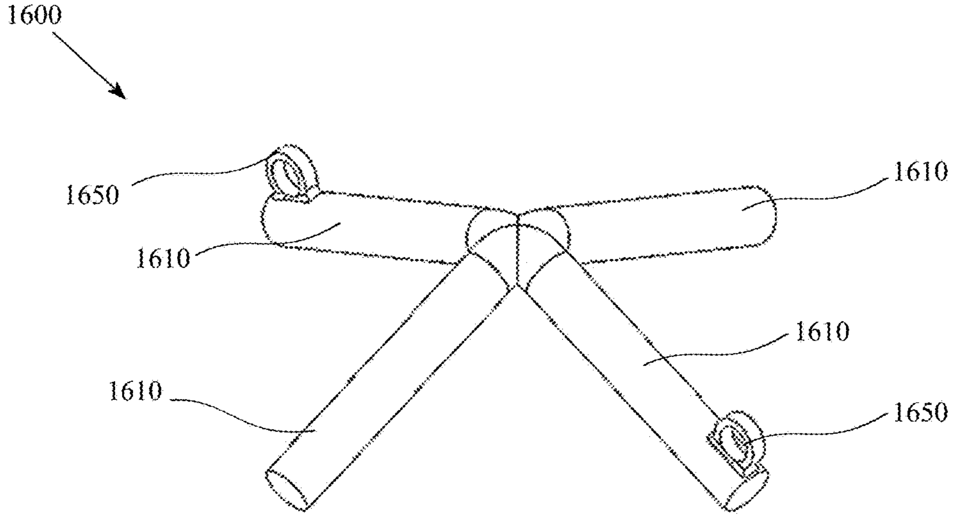
FIG. 13 is a perspective view of a bottom referencing mechanism of the present disclosure.
Figure 13A:
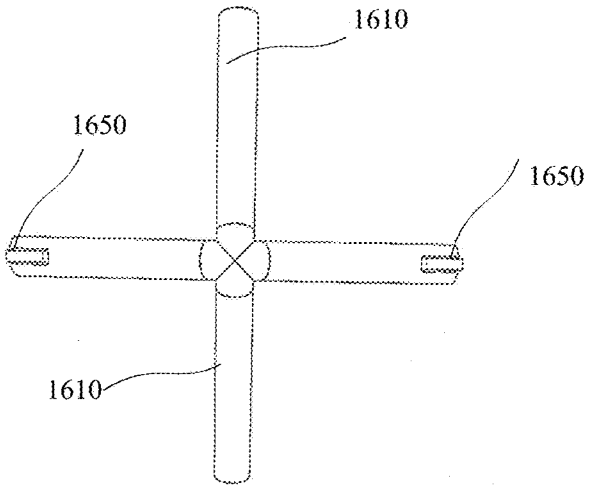
FIG. 13A is a top view of the bottom referencing mechanism of FIG. 13.
Figure 13B:
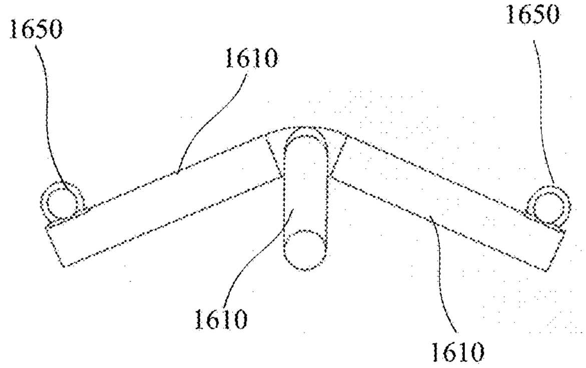
FIG. 13B is a side view of the bottom referencing mechanism of FIG. 13.
Figure 13C:
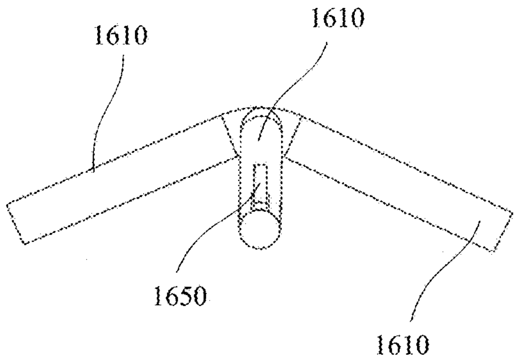
FIG. 13C is an opposite side view of the bottom referencing mechanism of FIG. 13.

FIG. 13 is an example of an embodiment of a bottom referencing mechanism 1600 comprising four radial arms 1610. Each radial arm can further include a series of connection points 1650 to tether the bottom referencing mechanism 1600 to a submersible housing via a cable assembly, similar to the system described in FIGS. 3A-3C. The cable assembly may comprise a pair of closed loops threaded through two sets of open ring connections positioned at a first set of mounting points and a second set of mounting points, which may allow the submersible housing to balance and orient itself above the bottom referencing mechanism through buoyancy forces.

The cable assembly may comprise two or more cables with connecting elements for coupling to the mounting points arranged along their lengths; each cable may have a first end coupled to a first mounting point, a connection point along its length coupled to a second mounting point, and a small buoy coupled to an opposing second end to maintain a level orientation. In some instances the submersible housing may itself be a buoy.

In some embodiments, the cable assembly coupling the housing to the anchor can comprise an artificial seaweed material to camouflage the system and attract aquatic wildlife. In some embodiments, the anchor is cross-shaped. In some embodiments, the bottom referencing mechanism comprises a platform arranged beneath the submersible housing, the second mounting points being disposed on the underside of the platform.

The cable assembly, which may comprise a pair of closed loops of cables, can couple the upper mounting points to a set of lower mounting points at the ends of each radial arm. The mounting points may also be open rings through which the cable loops can be threaded. A symmetrical arrangement of the cables through the rings can have the ability for them to slide through to enable a submersible housing to reorient itself according to the balance of tension. As the submersible housing may be buoyant, it can be pulled directly upwards, which may cause the cable assembly to slide to a point to accommodate, irrespective of the orientation of the cross-shaped anchor, since if one arm of the cross-shaped anchor is oriented downwards, the opposing arm will be oriented upwards to the same extent.

Another benefit of the bottom referencing mechanism 1600 is its ability to control the height of the anchor off the bottom by attaching to any number of loops extending upward from the bottom referencing mechanism 1600. Therefore, a submersible housing can be set from as little as about 6 inches off the bottom to about 3 feet off the bottom.

By adjusting the length of the cable loops, the height of the submersible housing above the bottom referencing mechanism 1600, and thus above the floor on which the bottom referencing mechanism 1600 rests can be controlled.

The cable loops can be replaced with a pair of rope attachments that can couple two of the upper mounting points to corresponding lower mounting points on the bottom referencing mechanism 1600 directly.

The rope material can be any thin, flexible material that is capable of providing an ample tether for the buoyant housing. Materials for this rope can be, but are not limited to: paracord, nylon cable, monofilament fishing line, etc. This rope can also be made out of artificial seaweed in order to better camouflage the system and even attract nearby aquatic wildlife.

Network Components

A server or controller, as described herein, can be any suitable type of computer. A computer may be a uniprocessor or multiprocessor machine. Accordingly, a computer may include one or more processors, and thus, the aforementioned computer system may also include one or more processors. Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), gated logic, programmable control boards (PCBs), and other suitable hardware configured to perform the various functionality described throughout this disclosure.

Additionally, the computer may include one or more memories. Accordingly, the aforementioned computer systems may include one or more memories. A memory may include a memory storage device or an addressable storage medium, which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, videotapes, audio tapes, magnetic recording tracks, magnetic tunnel junction (MTJ) memory, optical memory storage, quantum mechanical storage, electronic networks, and/or other devices or technologies used to store electronic content such as programs and data. In particular, one or more memories may store computer-executable instructions that, when executed by the one or more processors, cause the one or more processors to implement the procedures and techniques described herein. The one or more processors may be operably associated with the one or more memories so that the computer-executable instructions can be provided to the one or more processors for execution. For example, the one or more processors may be operably associated with the one or more memories through one or more buses. Furthermore, the computer may possess or may be operably associated with input devices (e.g., a keyboard, a keypad, controller, a mouse, a microphone, a touch screen, a sensor) and output devices such as (e.g., a computer screen, printer, or a speaker).

The computer can be equipped with a network communication device such as a network interface card, a modem, or other network connection device suitable for connecting to one or more networks.

A computer may advantageously contain control logic, program logic, or other substrate configurations representing data and instructions, which cause the computer to operate in a specific and predefined manner as described herein. In particular, the computer programs, when executed, enable a control processor to perform and/or cause the performance of features of the present disclosure. The control logic may advantageously be implemented as one or more modules. The modules may advantageously be configured to reside on the computer memory and execute on the one or more processors. The modules include but are not limited to, software or hardware components that perform certain tasks. Thus, a module may include, by way of example, components, such as software components, processes, functions, subroutines, procedures, attributes, class components, task components, object-oriented software components, segments of program code, drivers, firmware, micro code, circuitry, data, and/or the like.

The control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells.

The control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations and that these terms are merely conventional labels applied to physical quantities that exist within and during operation of the computer, based on designed relationships between these physical quantities and the symbolic values they represent.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general-purpose computing machines or devices may be used with programs constructed in accordance with some of the teachings described herein. In some embodiments, very specific computing machines with specific functionality may be required.

The disclosed embodiments are illustrative, not restrictive. While specific configurations of the camera system and related methods have been described in a specific manner referring to the illustrated embodiments, it is understood that the present invention can be applied to a wide variety of solutions which fit within the scope and spirit of the claims. There are many alternative ways of implementing the invention.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is also intended to include features of a claim in any other independent claim, even if this claim is not directly made dependent on the independent claim.

What is claimed is:

1. A camera system for capturing images of aquatic environments and wildlife, comprising:

one or more external devices and/or servers;

a sealed submersible housing comprising:

at least one camera;

a memory storage device;

a controller configured to trigger the camera to capture images;

a serializer in communication with a deserializer; and a referencing mechanism, structured and configured to maintain a consistent field of view for the at least one camera by preventing the at least one camera from freely rotating, and wherein the referencing mechanism is excluded from being within the field of view;

a communication cable disposed between the sealed submersible housing and a second housing;

the second housing comprising:

the deserializer;

a power source;

a wireless communications module configured to facilitate transmission of data to the one or more devices or servers;

wherein either the controller or the one or more servers are provided with a background state change detection script or an artificial intelligence model configured to perform image analysis and object detection on the captured images to identify objects of interest.

2. The camera system of claim 1, wherein the sealed submersible housing has two cameras, wherein the two cameras are oppositely opposed, and wherein each of the two cameras has their own oppositely opposed consistent field of view that excludes the referencing mechanism from being within either of the two oppositely opposed consistent fields of view.

3. The camera system of claim 1, wherein the controller is configured to trigger the camera to capture images at set intervals.

4. The camera system of claim 1, wherein the wireless communications is configured to communicate with LTE, and Wi-Fi, Bluetooth communication networks, and combinations thereof.

5. The camera system of claim 1, wherein the controller is configured to analyze each captured image individually after it is captured.

6. The camera system of claim 1, wherein the controller is configured to analyze batches of captured images after a predetermined number of images have been captured.

7. The camera system of claim 1, wherein the controller is configured to transmit batches of captured images to the one or more external servers for image analysis after a predetermined number of images have been captured.

8. The camera system of claim 1, wherein the referencing mechanism is coupled to the submersible housing.

9. The camera system of claim 1, wherein the referencing mechanism comprises a weighted anchor having a central point and a plurality of radially arranged arms.

10. The camera system of claim 9, wherein the plurality of radially arranged arms comprises a set of first mounting points positioned at their outer ends.

11. The camera system of claim 10, wherein the plurality of radially arranged arms further comprises a camouflage material.

12. A method for analyzing images of wildlife in an aquatic environments comprising the following steps:

providing a camera system for capturing images of aquatic environments and wildlife according to claim 1;

capturing an image at a set interval of time with the camera system;

compressing the image with the serializer;

transmitting the image via the communication cable to the deserializer; and processing the image with the detection script or the artificial intelligence model to identify an objects of interest.

13. The method of claim 12 wherein the controller analyzes the image to determine the presence of the object of interest subsequently to the capturing of the image.

14. The method of claim 12 wherein the controller stores a set number of images.

15. The method of claim 14 wherein the controller analyzes the set number of images to determine the presence of objects of interest.

16. The method of claim 14 wherein the controller transmits the set number of images to the one or more external servers, wherein the servers determine the presence of the objects of interest.

17. The method of claim 13 comprising the further step of sending a notification to the one or more external devices.

18. The method of claim 13 comprising the further step of sending a notification to the one or more external devices.

19. The method of claim 13 comprising the further step of initiating a video recording when the object of interest is detected.

20. The camera system of claim 1, wherein the sealed submersible housing is structured and configured to act as a buoy that can maintain a level orientation.

* * * * *